United States Patent [19]

Mentzer

[11] Patent Number: 4,756,937
[45] Date of Patent: Jul. 12, 1988

[54] PROTECTIVE BARRIERS, RECEPTACLES, LINERS AND PACKAGING FOR CONTAINERS OF HAZARDOUS CHEMICALS

[76] Inventor: Elizabeth A. Mentzer, 7446 Springfield-Jamestown Rd., Springfield, Ohio 45502

[21] Appl. No.: 44,153

[22] Filed: Apr. 30, 1987

[51] Int. Cl.$^4$ .......................... B32B 1/02; B32B 5/18; B32B 9/00
[52] U.S. Cl. .......................... 428/35; 428/68; 428/76; 428/166; 428/188; 428/305.5
[58] Field of Search ........................ 428/35, 68, 71, 74, 428/76, 166, 305.5, 188

[56] References Cited

U.S. PATENT DOCUMENTS

| | | | |
|---|---|---|---|
| 4,170,565 | 10/1979 | Flesher et al. | 428/305.5 |
| 4,228,954 | 10/1980 | Rosenzweig | 428/71 |
| 4,345,716 | 8/1982 | Armstrong et al. | 428/74 |
| 4,678,684 | 7/1987 | Sand | 428/305.5 |

Primary Examiner—William J. Van Balen
Attorney, Agent, or Firm—Jerome P. Bloom

[57] ABSTRACT

Embodiments of the invention, optionally usable as a protective wrapping, barrier, shield, receptacle and/or liner in the packaging of a container or containers of hazardous chemical, are demonstrated as layered structures. One comprises two layers one of which is porous and the second formed of compressible and expansible liquid and shock absorbing material and an antidote serving and operative in their composite as a barrier which substantially contains and renders substantially harmless that hazardous chemical which may be accidentally released from the container or containers over or about which said layered structure applies. Another embodiment comprises a layered structure embodying an antidote such as that above described the most remote layers of which are respectively provided by a porous material and a material presenting an impermeable surface. In this embodiment liquid and shock absorbing material together with said antidote is layered between said remote layers. Optionally, the antidote is sandwiched between, embodied in and/or carried by one or more layers of said layered structure. Preferably, the liquid and shock absorbing material will have a resilient, expansible cellular composition. Significantly improved encompassing covers, receptacles and envelopes for containers of hazardous chemical are a natural derivative of basic embodiments of the present invention.

19 Claims, 3 Drawing Sheets

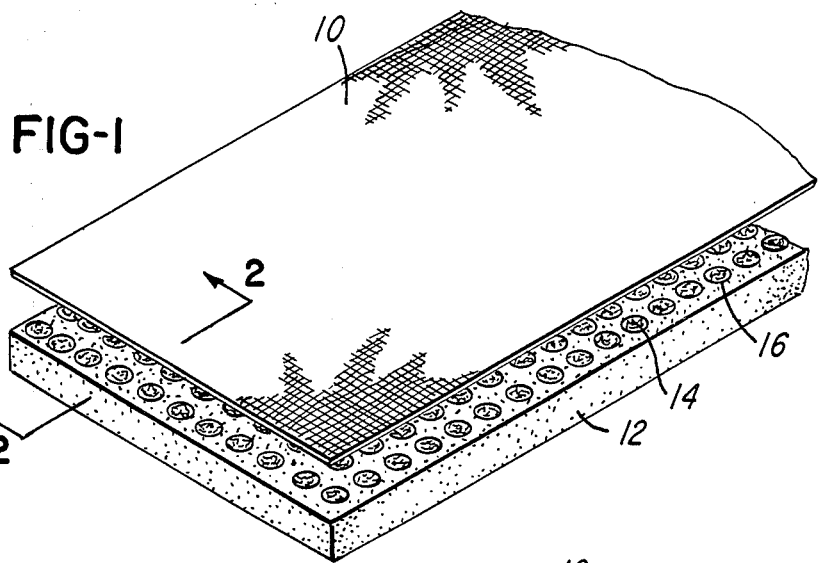
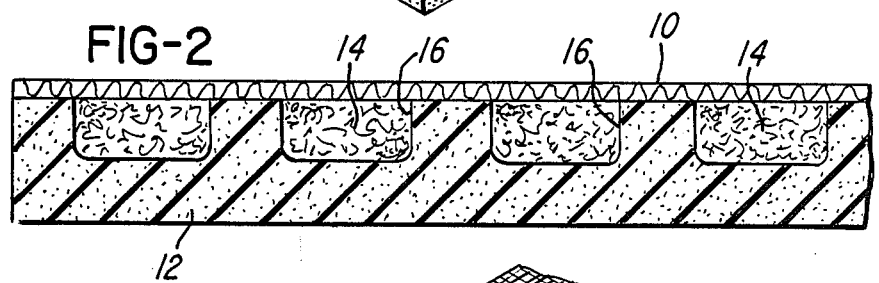
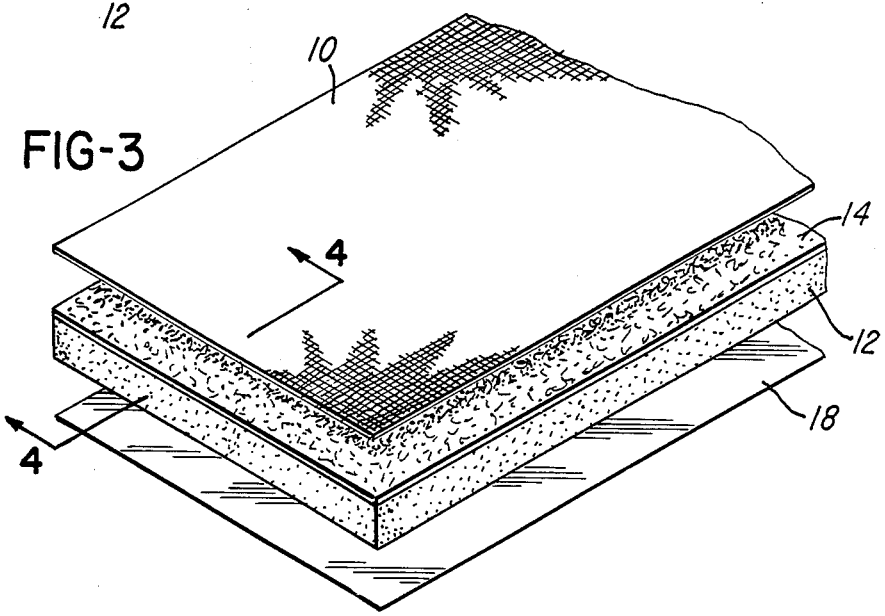
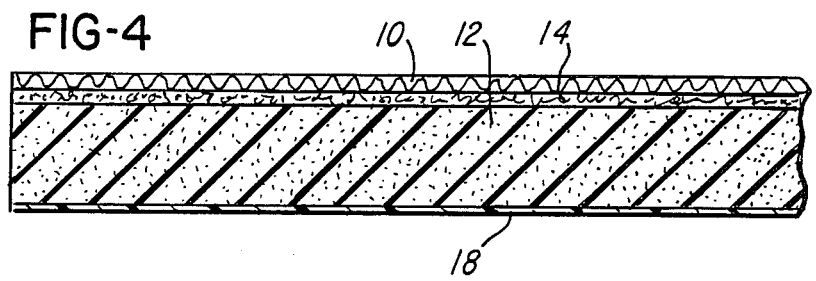

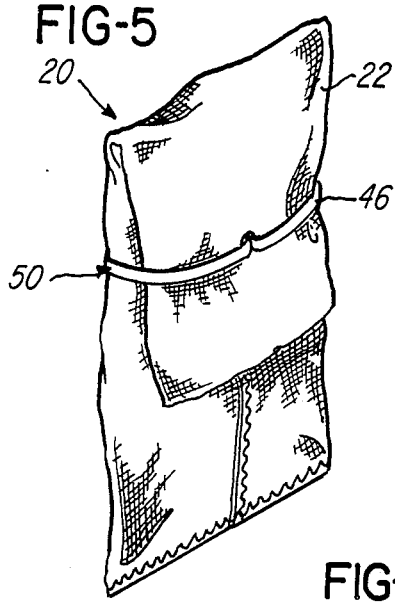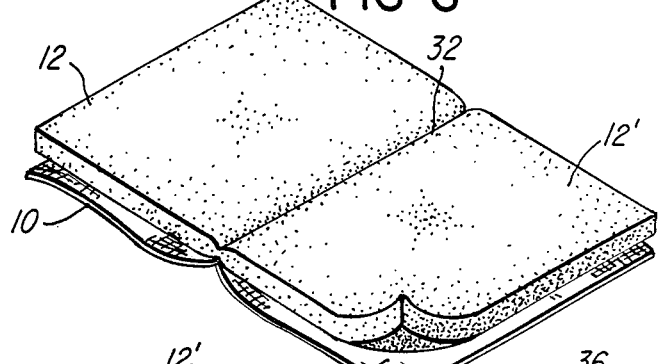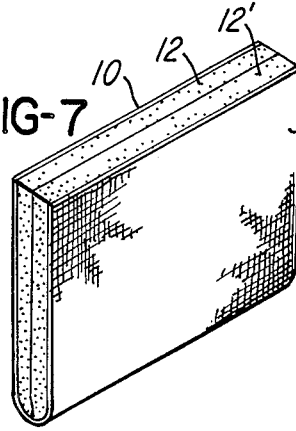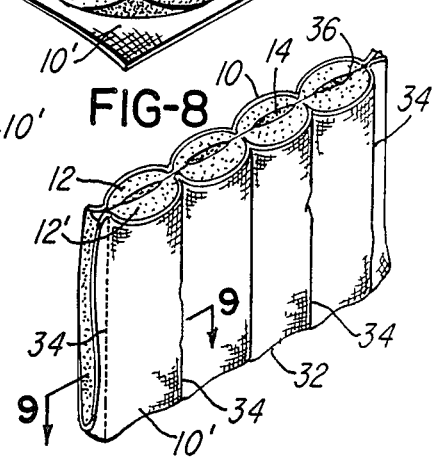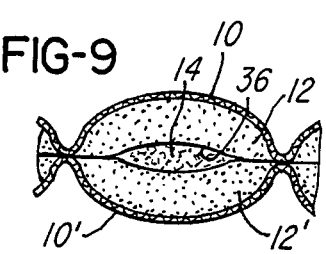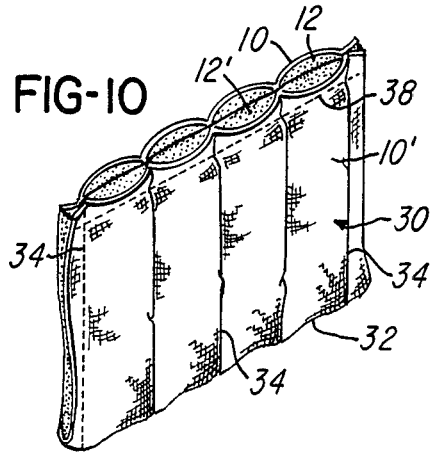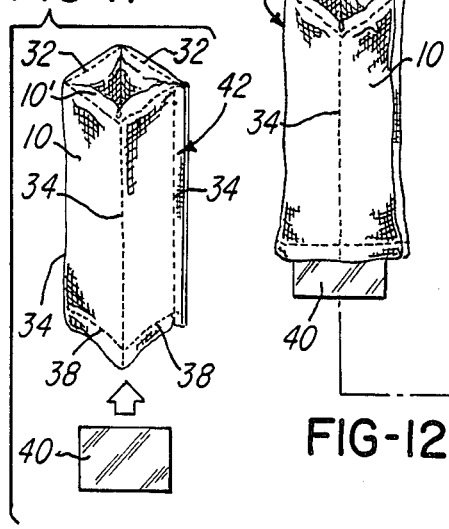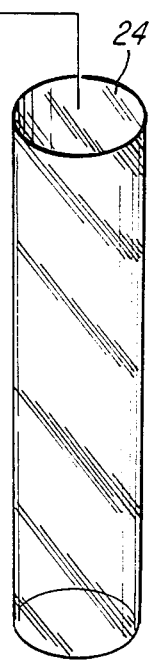

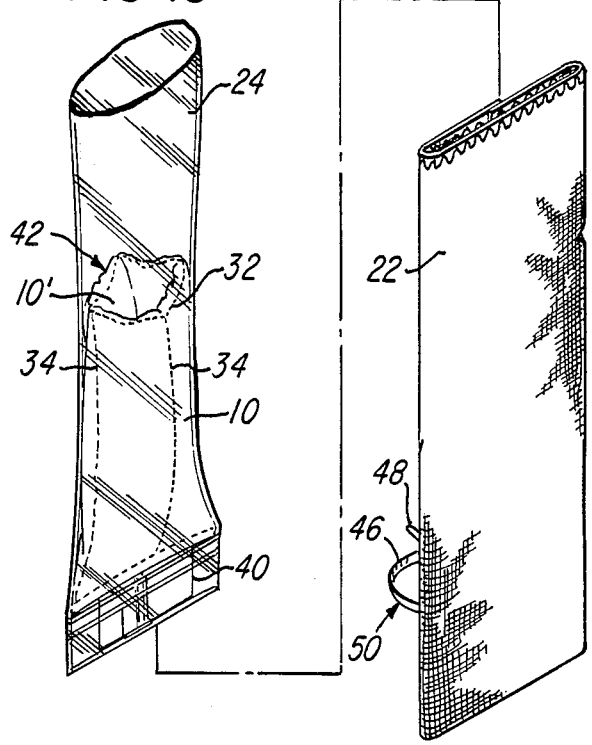
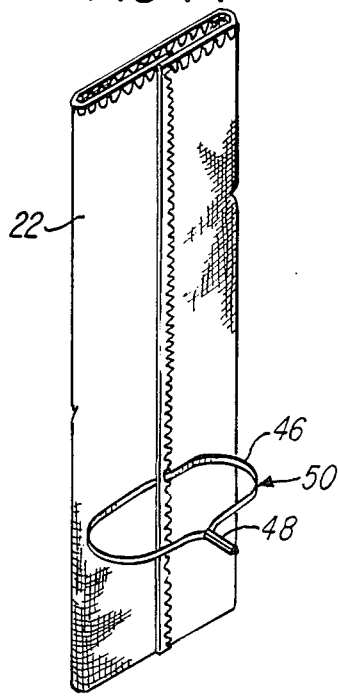
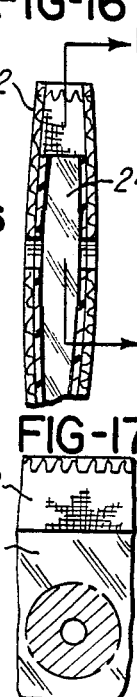
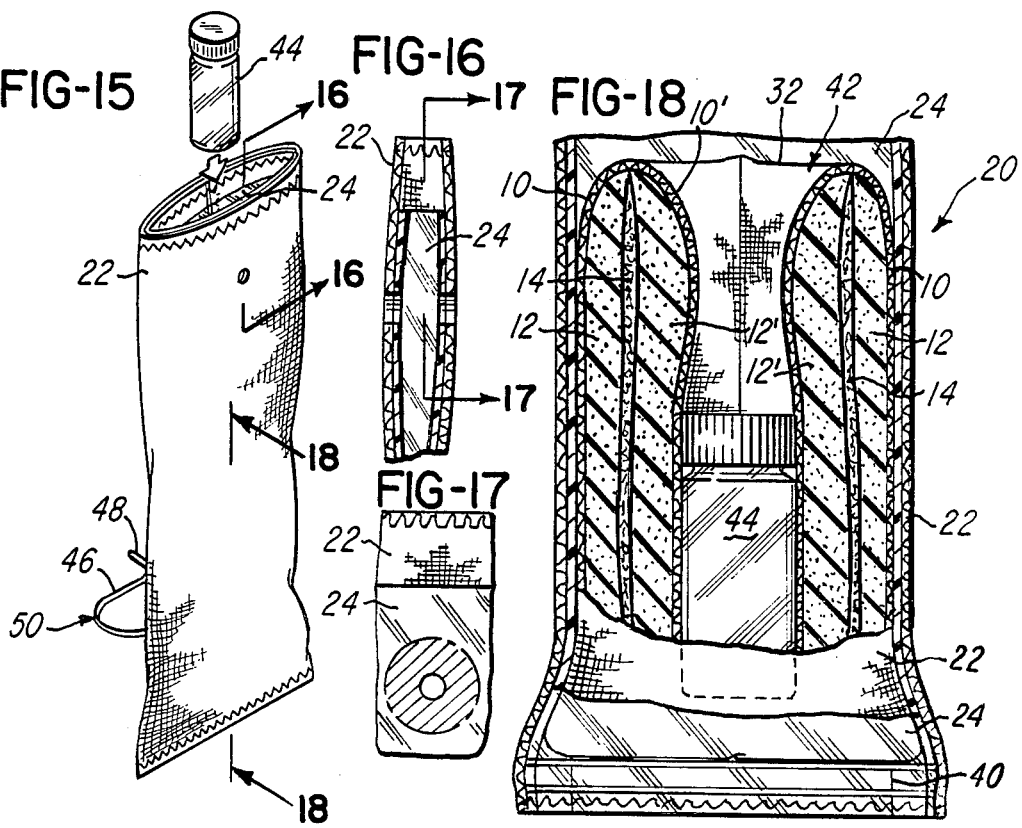
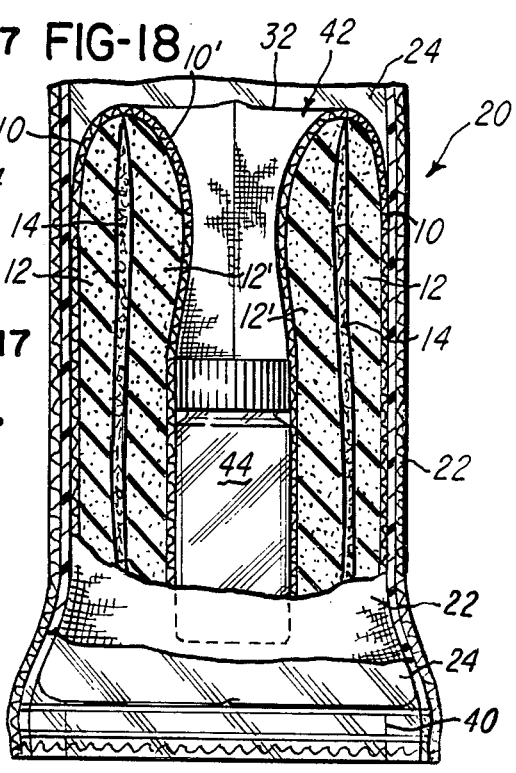

PROTECTIVE BARRIERS, RECEPTACLES, LINERS AND PACKAGING FOR CONTAINERS OF HAZARDOUS CHEMICALS

BACKGROUND OF THE INVENTION

The present invention relates to a multi-facted packaging concept particularly advantageous for use in the handling, transport and shipment of chemicals an uncontrolled release of which could be highly dangerous to our environment and either obviously or insidiously affect the health and welfare of those individuals exposed thereto.

Embodiments of the invention are optionally usable as a protective wrapping, barrier, shield, receptacle and/or liner in the packaging of a container or containers of hazardous chemical and are strikingly advantageous as applied to chemicals which may have been contaminated and resultingly fall in the category of hazardous waste. The problems encountered in and as a result of numerous occasions of unconstrained release of hazardous chemicals, a number of which have been currently experienced, are clearly a matter of general public knowledge and concern and demand solution as well as attention.

By way of example, and not by way of limitation, one form of embodiment of this invention solves a most serious long standing problem related to the handling, storage and shipment to a laboratory, for testing, of sample lots of a chemical suspect of having been contaminated in a manner or to an extent that it may constitute extremely hazardous waste requiring special handling and disposal.

In accordance with prior art practice samples of chemicals suspected of being contaminated are quietly and inobviously shipped to and from testing laboratories in conventional packaging by way of a common carrier. During the handling, loading and/or transport of such packages, they are often subject to disturbance and shock the degree and nature of which may suddenly or eventually result in leakage from or the breaking of the container(s) which hold(s) the chemicals. Should this occur the escaping chemicals will soak and/or break through and escape from their packaging. In such event, any person, cargo or other property exposed thereto will be placed in jeopardy the degree and nature of which will depend on the nature, character and amount of the chemical and/or contaminant involved. On the other hand the first person that may become aware of the fact that leakage or breakage has occurred may be that person who opens the package at its destination. Such an incident has occurred many times, as a result of which a person or persons handling or in the vicinity of that person opening the package will be unexpectedly exposed to its dangerous contents and have body contact therewith and/or inhale the fumes which exude therefrom. As should be readily obvious, the consequences of this can be a very serious threat to the health and welfare of those involved and a contamination of the environment in which the package was handled, opened and disposed.

Such problems as this are simply and effectively solved to a significant degree in the use of embodiments of the present invention in application to and about containers of contaminated and otherwise hazardous chemicals and within their receptacles during their storage and handling as well as in the packaging of such containers for their shipment from one place to another by common carriers.

No one of the parties to this disclosure is aware of any prior art which is specifically pertinent to the features of novelty which reside in the embodiments of the present invention.

SUMMARY OF THE INVENTION

Embodiments of the present invention variously present a wrapping, barrier, shield, receptacle and/or liner for use in the packaging of a container or containers of hazardous chemicals. They provide a most efficient and effective medium for such purposes and are particularly advantageous for use in the storage, handling or shipment of any liquids or other material which is contaminated or suspected of having been contaminated to a degree that its uncontrolled release and/or disposal without suitable precaution may result in a direct or indirect damage or threat of damage to person(s) and/or property exposed thereto.

One such embodiment comprises a layered structure including two layers, one of which is porous and the second formed of compressible liquid and shock absorbing material, and a chemical composition in the nature of an antidote serving and operative in their composite as a barrier to substantially contain and render substantially harmless that hazardous chemical which may be accidentally released from the container or containers over or about which said layered structure applies.

Another embodiment comprises layered structure incorporating an antidote such as that above described the most remote layers of which are respectively provided by a porous material and a material presenting an impermeable surface. In this embodiment liquid and shock absorbing material together with said antidote is layered between said remote layers and in use thereof said porous layer is positioned relatively adjacent the container or containers to which it applies and said impermeable surface of said layered structure is remote therefrom.

A further embodiment comprises a layered structure including at least two layers, at least one of which is porous, having means interposed therebetween including compressible and expansible liquid and shock absorbing material and in addition thereto material in the nature of an antidote operative to render the hazardous chemical or contaminated liquid content of the container or containers to which said layered structure applies relatively harmless on contact therewith in the event of its escape from such container or containers.

An additional embodiment comprises a layered structure including a plurality of successively adjacent layers of sheet-like material adjacent faces of which are in an immediately facing relation, of which layers at least one of two outermost thereof is porous or permeable and at least one intermediate layer is composed of compressible and expansible liquid and shock absorbing material together with material in the nature of an antidote operative to render the hazardous chemical content of the container or containers to which said layered structure applies relatively harmless on contact therewith, in the event of its escape from such container or containers during the storage handling or shipment thereof. A preferred embodiment of this type provides said layered structure with a coextensively extending impermeable backing at that face thereof remote from said porous layer.

An additional embodiment of the invention specially advantageous for use as a shipping receptacle for one or more small containers of liquid or hazardous chemicals suspected of contamination comprises a receptacle lined with layered material including at least two layers, at least one of which, positioning innermost of the receptacle, is porous, which layers have means interposed therebetween including compressible and expansible liquid and shock absorbing material and in addition thereto material in the nature of an antidote operative to render the hazardous liquid and chemical content of the container or containers to which said layered structure applies relatively harmless on contact therewith in the event of its escape from such container or containers. In one modification of this embodiment said layered structure is located within and anchored to a further receptacle having the form of a pouch or bag and in another the liquid and shock absorbing material is a resilient cellular material constructed and arranged to provide one or more pockets which nest portions of said antidote.

Another embodiment serving as a protective medium for hazardous contaminated materials and hazardous chemicals, in the storage, handling or shipment thereof, comprises an outer shell within which is an impermeable material, preferably in the nature of a plastic film, serving as a liner, immediately within which, in turn, and connected to form therewith a barrier structure within said shell is a layered arrangement of material comprising a plurality of layers including at least two layers, at least one of which is porous and disposed innermost and another of which is a compressible and expansible liquid and shock absorbing material, and in addition thereto material in the nature of an antidote operative to render substantially harmless and together therewith substantially contain that contaminated liquid or other hazardous chemical which may be accidentally released from the container or containers over or about which said layered structure applies on the introduction thereof to said shell. In preferred modifications thereof said layered arrangement of material and the outermost layer of impermeable material by which it is backed and to which it connects are anchored to interior surface portions of the shell or other receptacle in which they are applied.

In other preferred modifications said layered structure is provided by sections of material which have a sheet or sheet-like form. A particularly desirable execution of this last described embodiment has the form of a shipping envelope which solves the current most serious problem of handling, transport and shipment by common carrier of small bottles or other small containers of liquids and/or chemicals which are or are suspected of being dangerously contaminated.

An embodiment of the invention leading itself to use as an effective wrapping for containers of chemicals of the type described is characterized by a layered structure at least one layer of which is made of compressible and expansible liquid and shock absorbing material having in association therewith an antidote operative to render the hazardous chemical content of the container or containers to which the wrapping is applied essentially harmless on contact therewith and at least one other layer, to be placed most adjacent the container or containers to which the wrapping is applied, is porous. A modification provides that said two layers are outermost of such a layered structure and the one remote from said one layer is impermeable and by way of example constituted by an impermeable film.

Optionally, in any one of the aforesaid embodiments the antidote, the nature of which will be governed by its application, may be sandwiched between, embodied in and/or carried by one or more layers of said layered structure.

The embodiments illustrated are merely by way of example and not intended to limit in any respect the wide range of products which may be contemplated within or rendered obvious from either the foregoing or the following more detailed disclosure of the present invention or the appended claims.

Accordingly, it is a primary object of this invention to provide a multi-faceted containment and packaging concept particularly advantageous for use in the wrapping, handling, storage, and transport of hazardous materials including hazardous chemicals which is economical to execute and apply, more efficient and satisfactory in use and adaptable to a wide variety of applications.

A further object is to provide such a concept which is so versatile as to its execution that it lends itself to a ready adaptation thereof to the nature of the product to which it applies.

An additional object is to provide a most simplistic and effective means for and method of packaging and shielding containers of hazardous materials and lining receptacles for such containers the nature of which is such to essentially preclude the occurrence of any material adverse occurrence in the event of leakage from or breaking of such containers during the wrapping, handling, storage, transport or shipment thereof.

Another object is to provide embodiments of the multi-faceted concept of the present invention possessing advantageous structural features, inherent meritorious characteristics and means and mode of application such as herein described and illustrated.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the drawings wherein are shown some but not the only forms of embodiment of the present invention, FIG. 1 is a partially schematic exploded perspective view of a sheet formed barrier, liner or wrapping constituting one embodiment of the present invention;

FIG. 2 is a view taken on line 2—2 of FIG. 1;

FIG. 3 is a partially schematic exploded perspective view of a sheet formed barrier, liner or wrapping constituting a second embodiment of the present invention;

FIG. 4 is a view taken on line 4—4 of FIG. 3;

FIG. 5 illustrates a perspective view of a further embodiment which provides a new and improved shipping package embodying features of construction of the present invention;

FIGS. 5–17 demonstrate features of construction of the device exhibited in FIG. 5 in the course of the illustration of the steps of its fabrication; and FIG. 18 is a fragmentary sectional view, in elevation, of the embodiment of FIG. 5 illustrating the means and method of containment within the packaging of FIGS. 5–17 of a bottle of hazardous chemical, ready for shipping.

DESCRIPTION OF THE INVENTION

Significant features and derivative embodiments of the present invention, including those exemplified in and derivative from the foregoing SUMMARY, should be readily apparent from those illustrative embodiments subject of the accompanying drawings.

FIGS. 1 and 2 illustrate a sheet formed barrier, liner or wrapping constituting a basic embodiment of the present invention which is a layered structure. This layered structure comprises two outer layers of sheet material, one layer 10 of which is porous and the other layer 12 of which is made of a material capable of absorbing and containing liquid and is at the same time resilient and has a high capacity for accommodating and absorbing shock. By way of example but not by way of limitation the layer 10 is in this case made of fabric and the layer 12 is a sheet of foam rubber. Lodged between the layers 10 and 12, and shown in the drawings in schematic fashion, is a chemical 14 the nature of which is such that on contact thereof with a particular hazardous chemical, group of hazardous chemicals or any liquid embodying a contaminant a reaction occurs that renders said hazardous chemical, chemicals or liquid relatively harmless or so modifies or contains it as to significantly reduce, inhibit or prevent the possibility of its uncontrolled release. As should be obvious, the composition of the chemical 14 in any of the various embodiments of the present invention will in any case be tailored to and governed by its intended application.

FIGS. 1 and 2 demonstrate one mode of embodiment of the chemical 14 by means of which an amount thereof is dispersed between the layers 10 and 12 and lodged in pockets 16 formed in that face of the layer 12 which is immediately and coextensively overlaid by the sheet of fabric 10.

The composition so provided is integrated to the extent necessary by suitably interconnecting peripheral areas of the layers 10 and 12 by stitching or otherwise. The means and method selected, as should be obvious, will depend on their materials and the particularly intended application of the embodiment of which they form a part.

FIGS. 3 and 4 illustrate a further embodiment of the invention which is a modification of the layered structure of FIGS. 1 and 2. This embodiment additionally comprises a layer 18 which is provided by a sheet of impermeable material, in this instance a plastic film. In the example illustrated the layer 18 is applied to position in a coextensive backing relation to that surface of the layer 12 most remote from the layer 10, whereupon peripheral portions of layers 10, 12 and 18 are secured together to the extent necessary to produce a sheet-like layered structure intermediate the layers of which is a chemical capable of functioning as and for the applications intended.

The modification of FIGS. 3 and 4 is particularly desirable where the hazardous content of the containers wrapped, enveloped or otherwise protected by an invention embodiment might include liquid over and above that which can be modified, contained or retained by the layered structure which is backed by the sheet 12. The sheet 12 thus serves as a further retention and constraint medium in the embodiment to which it applies.

FIGS. 5-18 demonstrate a further embodiment of the invention in the nature of a pouch or envelope 20 which may serve as a shipping package for containers of hazardous chemicals, particularly advantageous for use in the handling, moving and shipping of samples of small quantities of known or potentially hazardous chemicals or liquids. As will be seen this embodiment exhibits a highly effective modification of the structure of FIGS. 1-2 and 3-4.

The pouch or envelope 20 comprises an elongate bag-shaped outer receptacle 22 made of a strong durable material such as canvas which defines a pocket. Anchored to and forming a secondary liner for the inner surface of bag 22 is a complementarily shaped liner 24 of an impermeable sheet material which for purpose of this illustration is a plastic film. The liner 24 is coextensive with the inner surface of the bag 22 from its base end 26 to a point adjacent and spaced from its mouth 28.

The liner 24 is anchored to the inner surface of bag 22 at selected points along its length including its base end and at directly opposed points adjacent its outer end which is spaced inwardly of and short of the mouth 28 of the bag 22. The latter connections are in this case achieved by a heat seal directed through the center of which is an aperture 25. The apertures 25 are themselves centered between the sides of the bag and as the bag is closed directly aligned. At one face of the bag 22, at a point in direct alignment with and longitudinally spaced from one of said apertures 25 which is formed therein adjacent its mouth, a portion of said bag is apertured to define therein a passage through which is threaded a relatively short length of elastic cord 46. The respective ends of cord 46 are joined outwardly of said bag by the application thereto of a plastic or metal sleeve 48 which clamps them together to form from said elastic cord a loop 50.

A layered structure 30 disposed in and forming a primary liner within the bag 22 is an extension and modification of the embodiment of FIGS. 1 and 2. In contrast to the structure of the embodiment of FIGS. 1 and 2 the layered structure 30 comprises, as a finished entity, two outer layers 10, 10' not only one but both of which are porous.

Within and sandwiched between the layers 10 and 10' are two layers 12 and 12' each of which, in this particular instance, is part of a sheet of foam rubber. A chemical 14 which will be of a nature and for the purposes previously described is carried by and/or positioned between the layers 12 and 12'. In the embodiment specifically illustrated portions of the chemical 14 applied to this layered structure are carried by and deposited within pockets defined between the layers 12 and 12'.

More particularly, in one manner of fabrication of the layered structure 30, in the first instance the layers 10 and 10' are provided by one sheet of fabric material and the layers 12 and 12' are likewise provided by a single sheet of material. These sheets are superposed and interconnected by a line of transversely extending stitching 32 (FIG. 6) which bisects their length (FIG. 6) and is perpendicular to their sides. Following this the interconnected sheets are folded on the line of stitching 32 to form thereby a four layered structure, seen in FIG. 7, the outermost layers 10, 10' of which are porous. Stitching 34 is now applied to join together the four layers 10, 12, 12' and 10' of said layered structure in lines respectively adjacent each of their lateral limits and intermediately thereof in lines parallel thereto. The stitching in this respect is so arranged that each pair of successively adjacent lines are equally spaced. In the process thereof one of a series of successively adjacent separate pockets 36 is defined between the layers 12 and 12' by each pair of successively adjacent, laterally spaced parallel lines of stitching 34 the mouth of which is uppermost as seen in FIG. 8.

Noting FIG. 9, each pocket 36 is filled with a charge of a chemical 14 suitable to the intended application of this embodiment of the invention. The upper edges of the four layers 10, 12, 12' and 10' are then joined by a line of stitching 38 (FIG. 10) which is parallel to the stitching 32 and closes the pockets 36 thereby to fully contain in each thereof an appropriate charge of the applied chemical. This achieves a blanket shaped wrapper, liner or barrier having features well evidenced in basic embodiments of the present invention.

The construction of FIG. 10 is then inverted and the lateral edges of this blanket formation are then brought together and suitably joined, in this case by a further line of stitching, to produce a tubular layered structure revealed in FIG. 11. One longitudinally extending half portion of this tubular structure is now flattened on the other at what may now be considered its base end. In the course of which to contain a short portion of the length of a rectangular piece of plastic 40 which is slipped therebetween prior to such flattening. The overlapped base end portions of the halves of said flattened tubular structure with said portion of the plastic 40 inserted therebetween are now stitched or otherwise suitably and fixedly joined together to leave in an axially projected relation thereto a section of the plastic piece 40. As will be seen, the piece 40 serves as an anchor since the outwardly projected portion thereof is used in anchoring the layered structure of which it now forms a part to the liner 24 and correspondingly to the bag 22. The modification of the configuration of said layered structure so achieved provides a conversion of the tubular configuration of the blanket shape into an elongate cup-like receptacle 42 seen in FIGS. 11 and 12.

The liner 24 of impermeable plastic film is in this example supplied as a tubular sleeve in the first instance. The internal diameter of this sleeve is made complementary to the external diameter of the mouth of the cup-like receptacle 42 which is slipped within the sleeve to position the projected portion of the anchor 40 within one end portion thereof, at which point said one end portion of said sleeve is flattened on and heat sealed to the anchor 40. With receptacle 42 and liner 24 thus firmly interconnected, the total thereof is inserted in bag 22, base end first, to position their interconnected base ends, as seen in FIGS. 13 and 18, to a position adjacent its base end 26, whereupon they are interconnected within and to the base end portion of bag 22 by a transverse line of stitching.

It is not until this point in the fabrication process illustrated that the liner 24 is fully attached and anchored to bag 22 as previously described. Once this is achieved, liner 24 not only becomes a secondary lining for the bag 22 but in effect a part of and an impermeable backing for the layered structure of the receptacle 42. The latter then provides the innermost and primary lining of the bag 22 and presents therein a pocket immediately bounded by its porous layer 10' which receives those containers to be stored and shipped within the bag 22. Particular attention is directed to the fact that the longitudinal extent of the receptacle 42 is somewhat less than that of the liner 24 which backs and forms a part thereof, the length of which is somewhat less than that of the bag 22 (FIGS. 13, 16 and 17).

As seen in FIGS. 15 and 16, receptacle 42, depending on the length of its pocket and inner diameter thereof, may receive and store therein one or more containers 44, the contents of which may either be a hazardous chemical or liquid containing hazardous chemical components, by virtue of which said contents are or may be potentially dangerous should they for any reason escape from their containers. When the receptacle 42 is filled, the resulting package is closed. This is achieved by flattening that portion of bag 22 immediately beyond said receptacle 42, closing the mouth thereof, and folding the longitudinal extent of said flattened portion down and in tightly overlapping relation to that face of bag 22 through which a portion of the elastic cord 46 was first threaded to align apertures 25 with the location on that face through which the loop 50 is now threaded and then, upon directing the portion 48 of said loop through the aligned apertures 25, bringing loop 50 over and about the bag and its overlapped end portion whereupon the loop by virtue of its resilience and limited extent serves to tightly wrap the whole bag, including said overlapped end portion, to maintain it in a substantially secure closed condition.

As will be obvious, each of the embodiments of the invention can be variously applied to a multitude of applications and in various manner. Moreover, in use thereof, it will be found that in each case they serve similar functions and achieve similar objectives including the stated objectives of the present invention, with a high degree of success and in a manner and by means not heretofore obvious in the prior art.

An illustrative application, use and function of the invention embodiments may be seen with particular reference to the embodiment shown and described with reference to FIGS. 5-18. A most serious problem is encountered in cases where there is a suspected contamination of water or chemical by PCBs (polychlorinated biphenyls). In order to determine the appropriate treatment and/or disposal of the water or chemical involved, it is necessary to first determine contamination, and if contamination is found to exist, the degree thereof. To this end it is necessary to package samples of the water or chemical involved in individual small containers and transport them to a laboratory for testing purposes, in the course of which it is essential that the quality of the samples be preserved. To this date the packaging of the container of each sample with any degree of integrity has been difficult to achieve. Further complicating the situation have been the difficulties encountered in the handling, storage and transport of said containers, usually by common carrier, during which it often occurs that the sample container is subject, inadvertently or otherwise, to shock or breakage. In either case the consequence of the shock or breakage is an escape of the contents of the container or containers involved. Where the contents are contaminated more often than not the heretofore conventional packaging utilized is quickly soaked and in some cases broken, resulting in the dissemination of obnoxious odors and fumes which invade the environment in which this occurs and a consequent threat to the person or persons and that property immediately in the vicinity of the soaked or broken packaging. In some cases the escape of the contents of the container(s) is not immediately apparent and first encountered within a building where the sample or samples are received. In any case, there is a threat and damage or potential damage both to property and the environment in which the packaging is opened as well as the most dangerous effect, namely an inhaling of the contaminant. The occurence described is particularly destructive when the packages of the samples are being transmitted by common carrier, the operator of which may not be knowledgable as to the proper procedures for handling the situation. The foregoing has been a constant source of concern.

If there should be such an unfortunate occurence in use of the embodiment of FIGS. 5–18 as packaging in shipment of said samples, the porous innermost layer 10 which bounds the container(s) of the sample(s) allows and directs the escaping contaminated contents of the sample container therethrough in a relatively dispersed fashion in the process of which to be dispersed into and throughout portions of the layer 12 of liquid accommodating and shock absorbing material which is also a retardant to flow therethrough and to encounter and react with the antidote 14 which is also dispersed between layers 10 and 12. The net result is a reactant interaction between the antidote and the escaping contents producing a gel, reinforced by the liquid accommodating and shock absorbing backing layers which form therewith not only a barrier to movement therethrough of the gel but with the addition of the inner connected impermeable layer 24 a means for containment thereof to a degree to essentially insure against any such disastrous occurrence that might result in use of the prior art packaging.

By way of example and not by way of limitation, in considerable testing of the bag 20 reproducing conditions such as above described using "OIL BOND-100" as the antidote for samples of trichlorobenzene contaminated with polychlorinated biphenyls it was repeatedly found that the results and consequences of use of the layered structure of the invention in the receptacle for the container(s) of the samples were just as described above.

It should be well apparent from the foregoing that use of other embodiments of the invention will result in their similar function and similar highly desirable benefits and a solution to the problems which were and are the target of the present invention. It should be also apparent that embodiments of the invention may apply in various forms, size and configuration to the handling, storage and shipment of a great variety of hazardous materials with resulting containment and diminishing if not eliminating most dangerous aspects prior to exposure thereof to persons, communities and various environments. It should be understood, of course, that the "antidote", the reactant agent 14, will be tailored to that material to which the invention embodiment thereof will be applied.

The embodiments of FIGS. 1–4 and any embodiments derivative therefrom will clearly be of similar service and utility and lead to applications thereof which are self evident, the consequences of which will not only be of significant benefit to our environment and general welfare but result also in significant economies to the users, recipients and the various governmental agencies which are plagued by repeated expenditures to correct the unfortunate, undesirable results of accidental or inadvertent release of hazardous materials in various form with resultant undesirable consequences.

From the above description it will be apparent that there is thus provided a device of the character described possessing the particular features of advantage before enumerated as desirable, which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Apparatus for use as a wrapping, barrier, shield and/or liner for application about and/or in bounding relation to a container or containers of hazardous and/or contaminated materials, as a protective medium for use in the storage, handling or shipment thereof, comprising a layered sheet-like structure including at least two layers at least one of which comprises a liquid accommodating and shock absorbing structure and another of which a porous structure, said porous structure providing that layer positioned most adjacent such a container or containers in the use thereof, and a material forming part of said layered structure conditioned to react with and to substantially reduce the hazard of an escape of hazardous content from such container or containers to which said wrapping, barrier, shield and/or liner may be applied.

2. Apparatus as in claim 1 wherein at least said one layer has a cellular structure, is resilient, has an ability to flex and said reactant material is associated therewith.

3. Apparatus as in claim 1 wherein pockets are defined within the limits of said layered structure at least a portion of which accommodate said reactant material.

4. Apparatus as in claim 1 wherein said layered structure includes a pair of adjacent facing layers of a shock and liquid absorbing structure which are connected to form pockets therebetween each of which pockets is adapted to contain therein a portion of said reactant material.

5. Apparatus as in claim 1 wherein said liquid accommodating and shock absorbing structure carries at least part of said reactant material.

6. Apparatus as in claim 1 wherein said reactant material is applied between said liquid accommodating and shock absorbing structure and said porous layer of said layered structure.

7. Apparatus as in claim 1 wherein said layered structure is formed into the configuration of a cup-like receptacle.

8. Apparatus as in claim 1 wherein said layered structure has a layer of impermeable material at the face thereof most remote from said porous layer.

9. A wrapping, barrier, shield and/or liner for application about a container or containers of hazardous chemicals, as a protective medium for use in the storage, handling or shipment thereof, comprising a layers being porous and an outer layer of layers, one of said two layers being porous and an outer layer of said layered structure which in application thereof is positioned relatively adjacent or immediately about a container or containers of hazardous chemicals, the other of said two layers being composed at least in part of compressible and expansible liquid and shock absorbing material, and an antidote forming a part of said layered structure operative to substantially reduce the hazard of an escape of hazardous content from a container or containers thereof to which said wrapping, barrier, shield and/or liner may be applied.

10. Apparatus as in claim 9 including a layer of impermeable material, said layer of impermeable material and said one layer which is porous providing respectively the outermost layers of said layered structure and said antidote being located within said layered structure, intermediate the limits thereof defined by said outermost layers.

11. Apparatus as in claim 9 wherein said porous outer layer is provided by fabric and said impermeable surface is provided by a plastic film.

12. Apparatus as in claim 9 wherein said antidote is applied to the other of said two layers.

13. Apparatus as in claim 9 wherein said layered structure as a composite has a sheet-like form.

14. Apparatus for use in the storage, handling and shipping of containers of hazardous contaminated materials or hazardous chemicals, comprising an outer receptacle, layered material within said receptacle including a first layer formed of impermeable material and within said first layer a plurality of additional layers including at least two layers, at least one of which is porous and disposed innermost and another of which is a compressible and expansible liquid and shock absorbing material, and in addition thereto material associated therewith in the nature of an antidote operative together with at least a portion of said layered material to substantially contain and render substantially harmless contaminated liquid or other hazardous chemical which may be accidentally released from a container or containers thereof placed within and bounded by portions of said layered material within said receptacle.

15. Apparatus as in claim 14 wherein said first layer is connected with, anchored to and forms a primary linear for interior surface portions of said receptacle and said plurality of layers are interconnected with each other and anchored within said first layer to form a secondary liner for said receptacle which positions about and bounds and serves as a protective barrier for such container or containers of contaminated liquid or other hazardous chemical as are placed within said receptacle.

16. Apparatus as in claim 14 characterized in that said plurality of layers are interconnected and formed to define cup shaped means for nesting, protecting and cushioning one or more of said containers placed in said receptacle.

17. Apparatus as in claim 16 wherein said receptacle is a hag-like structure, said first layer is formed by plastic film, said expansible liquid and shock absorbing material is a resilient cellular structure and said antidote is associated with said porous layer and said compressible and expansible liquid and shock absorbing material.

18. Apparatus as in claim 14 wherein portious of said antidote are applied to surface portions of said compressible and expansible liquid and shock absorbing material.

19. Apparatus as in claim 14 wherein said receptacle has the form of an envelope the inner surface of which is lined by said first layer from its base to a point short of a flap portion thereof which folds over the remainder thereof to effect a closure of said envelope and said plurality of layers within said first layer nests inwardly of the pocket defined by said first layer and said porous layer forms a bounding surface for such of said containers as are disposed within said envelope to protect handlers and carriers thereof and inhibit damage such as might otherwise be occasioned in the accidental release of its or their contents.

* * * * *

UNITED STATES PATENT AND TRADEMARK OFFICE
CERTIFICATE OF CORRECTION

PATENT NO. : 4,756,937
DATED : July 12, 1988
INVENTOR(S) : Elizabeth A. Mentzer

It is certified that error appears in the above-identified patent and that said Letters Patent are hereby corrected as shown below:

Col. 1, line 7, "facted" is corrected to read -- faceted --.

Col. 10, line 62 (Claim 9, lines 4-5), "layers being porous and an outer layer of" is deleted and -- layered structure including at least two -- is substituted therefor.

Col. 12, line 2 (Claim 15, line 2), "linear" is corrected to read -- liner --;

line 17 (Claim 17, line 2), "hag" is corrected to read -- bag --;

line 22, (Claim 18, line 1), "portious" is corrected to read -- portions --.

Signed and Sealed this

Eighth Day of November, 1988

Attest:

DONALD J. QUIGG

Attesting Officer      Commissioner of Patents and Trademarks